United States Patent
Brand et al.

(10) Patent No.: US 8,840,058 B2
(45) Date of Patent: Sep. 23, 2014

(54) AIRFOIL SHAPED TAIL BOOM

(75) Inventors: Albert G. Brand, North Richland Hills, TX (US); Jimmy Narramore, Austin, TX (US); James H. Harse, Bedford, TX (US); Brendan P. Lanigan, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 13/554,309

(22) Filed: Jul. 20, 2012

(65) Prior Publication Data

US 2012/0280079 A1 Nov. 8, 2012

Related U.S. Application Data

(63) Continuation-in-part of application No. PCT/US2010/049506, filed on Sep. 20, 2010.

(51) Int. Cl.
*B64C 27/82* (2006.01)

(52) U.S. Cl.
CPC ......... *B64C 27/82* (2013.01); *B64C 2027/8245* (2013.01)
USPC .................................... 244/17.19; 244/17.21

(58) Field of Classification Search
USPC ........................... 244/17.11, 17.19, 17.21, 91
See application file for complete search history.

(56) References Cited

U.S. PATENT DOCUMENTS

| | | | |
|---|---|---|---|
| 4,200,252 A | 4/1980 | Logan et al. | |
| 4,708,305 A | 11/1987 | Kelley et al. | |
| 4,928,907 A * | 5/1990 | Zuck | 244/6 |
| 5,209,430 A | 5/1993 | Wilson et al. | |
| 6,416,015 B1 * | 7/2002 | Carson | 244/17.19 |
| 6,666,654 B2 * | 12/2003 | Olhofer et al. | 416/228 |
| 6,755,374 B1 * | 6/2004 | Carson | 244/17.19 |
| 3,059,877 A1 | 5/2012 | Lee | |
| 2003/0170125 A1 * | 9/2003 | Olhofer et al. | 416/228 |
| 2009/0277991 A1 | 11/2009 | Mikulla | |

FOREIGN PATENT DOCUMENTS

| | | |
|---|---|---|
| JP | 5193582 | 8/1993 |
| WO | 0126966 | 4/2001 |
| WO | 2012039702 | 3/2012 |

OTHER PUBLICATIONS

International Search Report dated Nov. 19, 2010 from corresponding International Application PCT/US2010/049506.
Article 34 Amendments dated Jul. 15, 2011 from corresponding International Application PCT/US2010/049506.
European Search Report dated Jun. 9, 2013 from counterpart EP App. No. 13175696.7.
European Office Action dated Sep. 18, 2013 from counterpart EP App. No. 13175696.7.
Office Action dated Jul. 2, 2014 from counterpart EP App. No. 13175696.7.

* cited by examiner

*Primary Examiner* — Philip J Bonzell

(74) *Attorney, Agent, or Firm* — James E. Walton; Richard G. Eldredge

(57) ABSTRACT

A system and method to control fuselage torque of an aircraft. The system includes a tail boom having a first surface that creates a high-pressure region in a downward rotorwash and a second surface that creates a low-pressure region in the downward rotorwash. The difference in pressure regions creates a lateral force that opposes the fuselage torque.

12 Claims, 6 Drawing Sheets

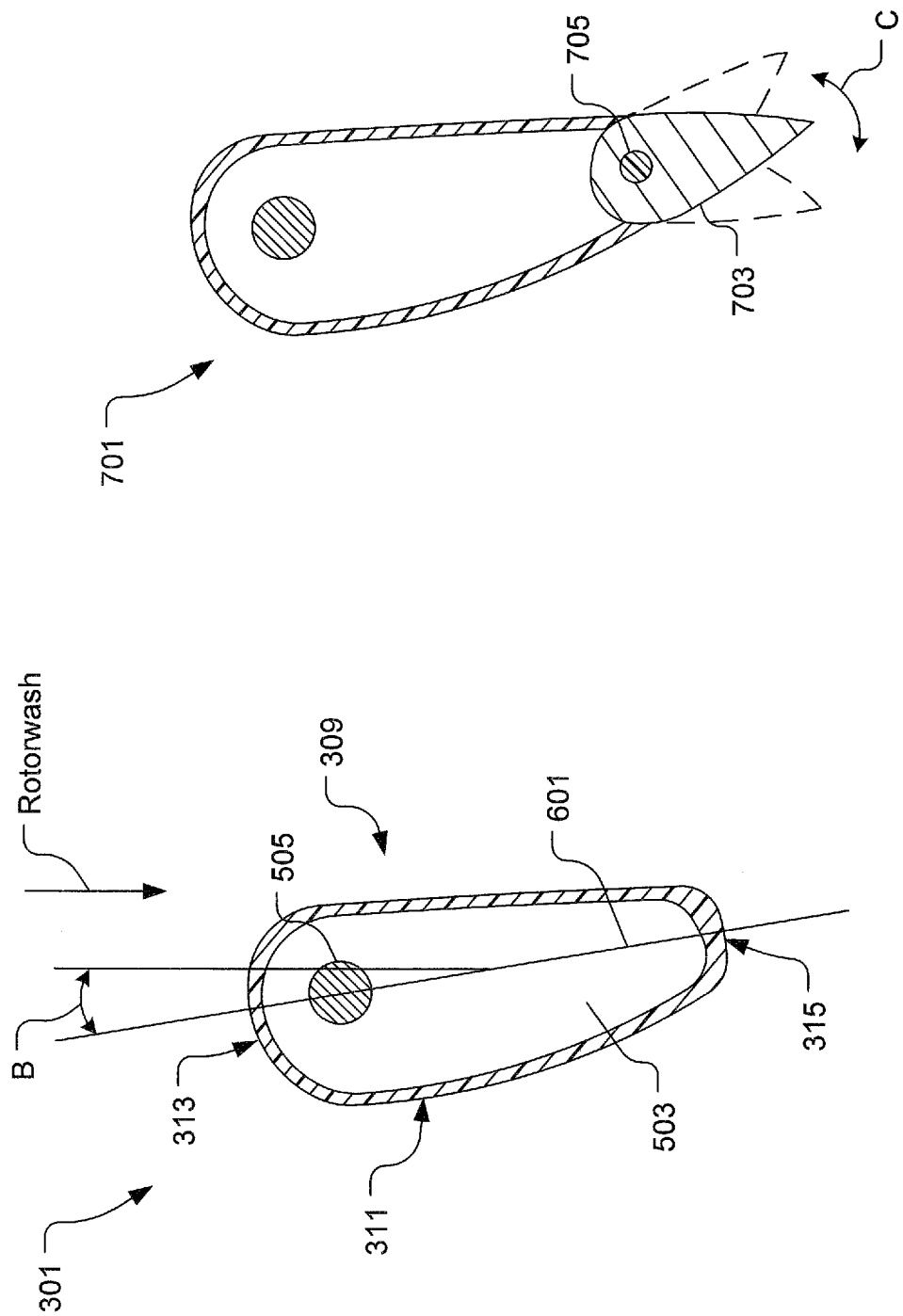

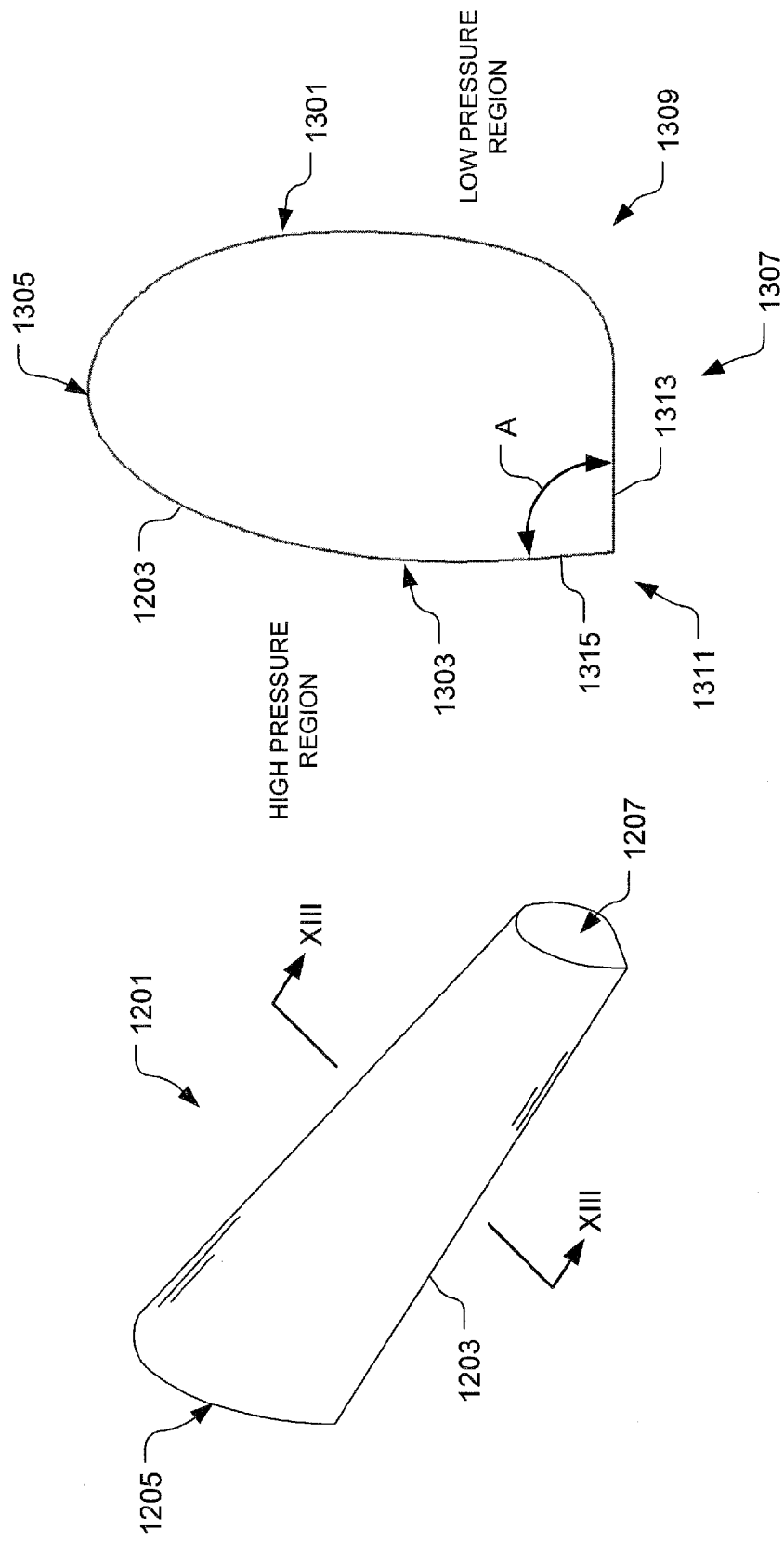

AIRFOIL SHAPED TAIL BOOM

CROSS REFERENCE TO RELATED APPLICATIONS

This application is a continuation-in-part application of International PCT Application No. PCT/US2010/049506, filed 20 Sep. 2010, titled "Airfoil Shaped Tail Boom," which is hereby incorporated by reference for all purposes as if fully set forth herein.

BACKGROUND

1. Field of the Invention

The present application relates generally to rotary aircraft, and more particularly, to tail booms for helicopters.

2. Description of Related Art

Conventional helicopters typically include one or more main rotors situated above a fuselage and an engine disposed within the fuselage for rotating the main rotor. During operation, the engine exerts a torque on the fuselage ("fuselage torque"), which causes the fuselage to rotate in a direction opposite to that of the main rotor rotational movement. Fuselage torque is greatest during high power operation, namely, during very low or very high speed flight.

During operation at low forward speeds, downwash is at its maximum, thus requiring greater torque control to counteract the fuselage torque. Tail rotors are effective anti-torque devices for controlling fuselage torque during takeoff, landing, and during low forward speed flight. FIG. 1 shows a conventional helicopter 1 comprising a main rotor 2 situated above the fuselage and a tail rotor 4 attached to the aft section of the fuselage via a tail boom 3. The tail rotor and associated drive system must be sized for the low speed regime. As a result, the tail rotor is generally larger and heavier than needed in other flight regimes and produces additional drag and power penalties at high speeds. These factors are cumulative and all result in degradation of helicopter performance.

Some conventional helicopters include strakes, fins, and/or other suitable devices for controlling the fuselage torque. During high speed flight, the torque control can be provided by aerodynamic surfaces, such as fins. However, during low speed flight, these surfaces are ineffective. FIG. 2 illustrates a cross-sectional view of tail boom 3 of helicopter 1. Auxiliary wings 5A and 5B extend alongside the outer surface of tail boom 3 for directing the downward rotorwash in a lateral direction relative to the tail boom. Wings 5A and 5B redirect the rotorwash in a lateral direction relative to the tail boom. Strakes and fins are effective means for counteracting the fuselage torque; however, strakes and fins increase the overall weight of the aircraft, which in turn, requires the main rotor to create additional lift to compensate for the added weight. In addition, the added weight decreases the lifting capacity of the aircraft. Furthermore, strakes and fins include the additional download penalty associated with higher vertical drag from the rotorwash.

Other helicopters include circulation control tail booms comprising one or more inner ducts disposed within the tail boom for channeling exhaust and/or other types of engine-driven fluid through the tail boom. The channeled fluid exits the tail boom through one or more exit ports in a lateral direction relative to the tail boom. The circulation tail boom provides sufficient anti-torque to completely eliminate the need for a tail rotor; however, the tail boom significantly increase the overall weight of the helicopter, thereby increasing the power consumption and rendering the design ineffective in most applications.

Although the foregoing developments represent great strides in the area of anti-torque devices for a helicopter, many shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood with reference to the following detailed description when read in conjunction with the accompanying drawings, wherein:

FIG. 6 is a cross-sectional view of the tail boom of FIG. 5 taken at VI-VI;

FIG. 7 is an alternative embodiment of the tail boom of FIG. 6 shown with a flap;

FIG. 12 is an alternative embodiment of a tail boom; and

FIG. 13 is a cross-sectional view of the tail boom of FIG. 12 taken at XIII-XIII.

Figure 1:
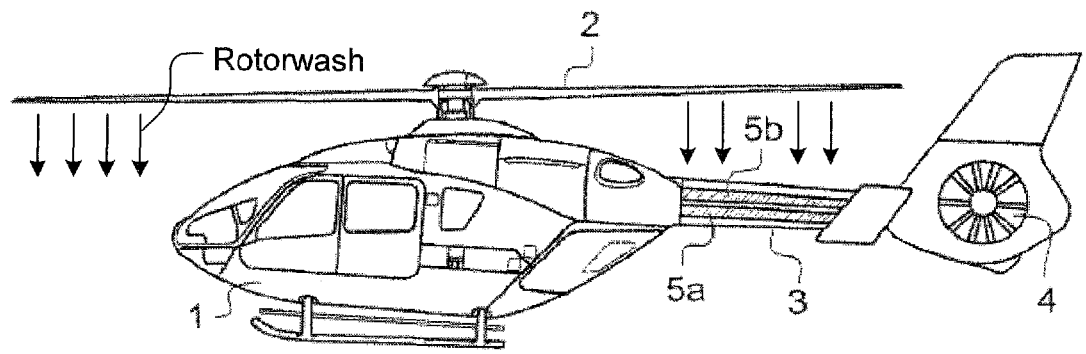
FIG. 1 is a side view of a conventional helicopter.
Figure 2:
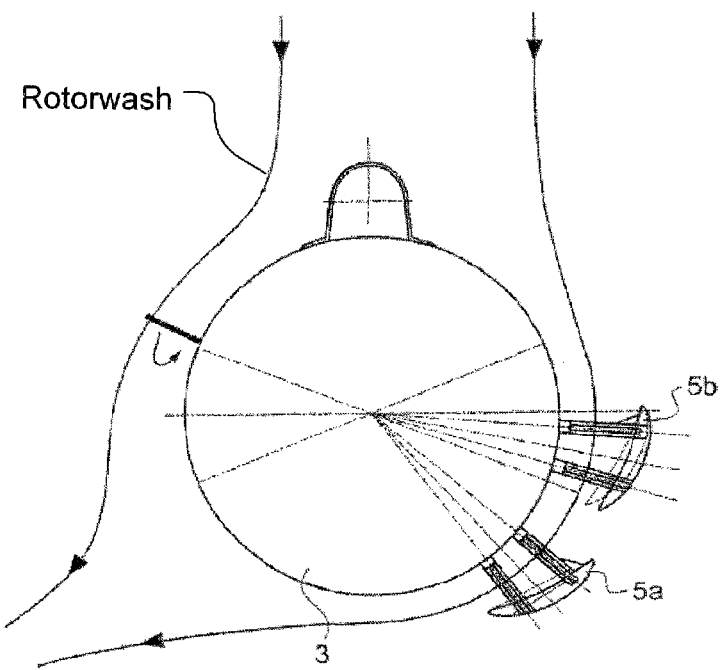
FIG. 2 is a schematic depiction of rotorwash flowing around a cross-sectional view of a tail boom of FIG. 1.

While the tail boom of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the system and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The tail boom of the present application overcomes common disadvantages associated with conventional anti-torque devices for rotary aircraft. Specifically, the tail boom is a light and effective means for providing a lateral force to counteract the fuselage torque. These features are achieved by providing a tail boom shaped similar to an airfoil, wherein a first side surface acts as a pressure surface of an airfoil, thereby creating a high-pressure region near the surface, and wherein a second side surface acts as a suction surface of an airfoil, thereby creating a low-pressure region near the surface. The pressure difference between the two pressure regions causes the tail boom to move in the direction towards the low-pressure region, which in turn, rotates the tail boom in a lateral direction opposing the fuselage torque.

The tail boom of the present application will be understood, both as to its structure and operation, from the accompanying drawings, taken in conjunction with the accompanying description. Several embodiments of the tail boom are presented herein. It should be understood that various components, parts, and features of the different embodiments may be combined together and/or interchanged with one another, all of which are within the scope of the present application, even though not all variations and particular embodiments may be specifically illustrated in each figure.

It should be understood that the preferred embodiment of the tail boom is operably associated with a helicopter. However, the tail boom is readily and easily adaptable for operation with other types of rotary aircraft.

Figure 3:
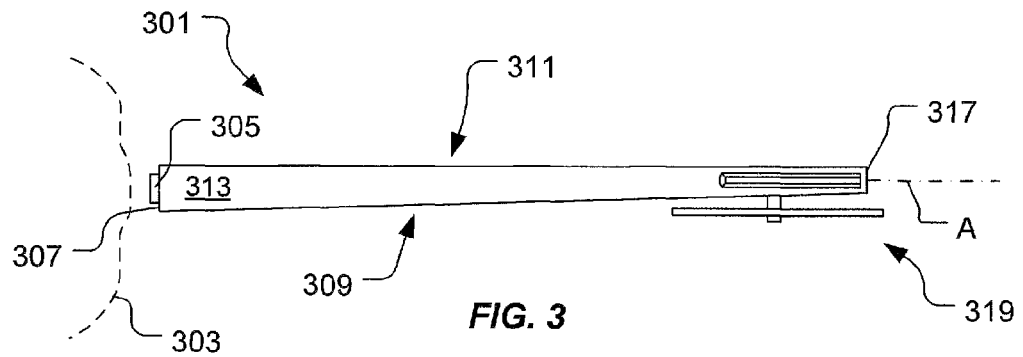
FIG. 3 is a top view of a tail boom according a preferred embodiment of the present application.

Referring now to FIG. 3 in the drawings, a top view of a tail boom 301 according the preferred embodiment of the present application is shown. FIG. 3 illustrates tail boom 301 detached from the aft section of an aircraft fuselage 303. In the preferred embodiment, tail boom 301 remains rigidly attached to fuselage 303; however, it should be appreciated that alternative embodiments could include an attachment device 305 or other suitable means for rotatably attaching end 307 of tail boom 301 and the aft section of fuselage 303 such that tail boom 301 rotates about an axis A. The alternative embodiment enables tail boom 301 to either reduce or increase the lateral force, which in turn, changes the resulting force opposing the fuselage torque. In the alternative embodiment, a control system (not shown) operably associated to attachment device 305 would either manually or autonomously control the rotational movement of tail boom 301.

Figure 4:
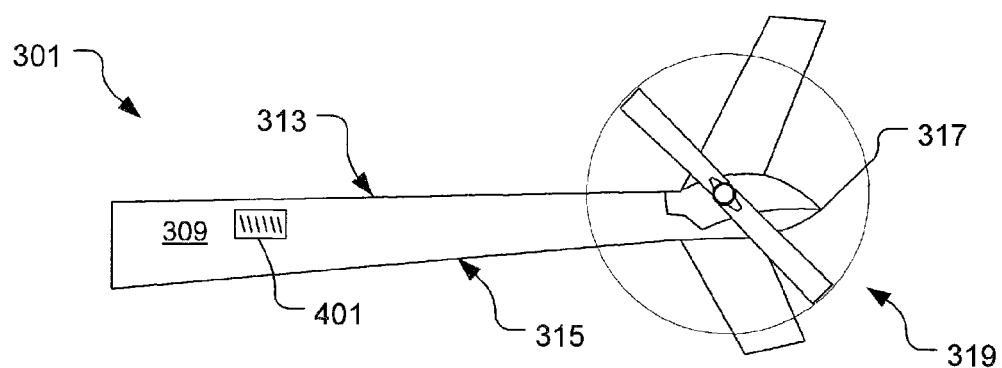
FIG. 4 is a left side view of the tail boom of FIG. 3.

Tail boom 301 preferably comprises a first side surface 309, an opposing second side surface 311, a top surface 313, and a bottom surface 315 (bottom surface 315 is shown in FIG. 4). In the preferred embodiment, tail boom 301 is manufactured as a unitary member having a shape similar to an airfoil such that side surface 309 acts as the pressure surface of an airfoil, while side surface 311 acts as the suction surface of an airfoil. Side surface 309 and side surface 311 gradually taper toward each other to form surface 313 and surface 315, which act as leading and trailing edges of an airfoil, respectively. In an alternative embodiment, surface 315 can be optionally configured as a flat surface to provide a well-defined flow separation line between side surface 309 and surface 315, or between side surface 311 and surface 315. The truncated airfoil surface 313 could alternatively be tapered to form a sharp trailing edge, where side surface 311 joins surface directly to side surface 309 instead of including surface 315. The optimal configuration would account for the necessary tail boom structural volume, stiffness, and weight as well as handling qualities that may include sideward flight requirements.

The tail boom of the present application provides significant advantages over conventional anti-torque devices. In particular, the tail boom is capable of providing the necessary force to counteract the fuselage torque merely by the contoured shape of side surface 309 and side surface 311. During operation, downward rotorwash creates a high-pressure region near side surface 309 and a low-pressure region near side surface 311, resulting in tail boom 301 moving towards the low-pressure region, in a direction opposing the fuselage torque. Tail boom 301 can either supplement an additional anti-torque device, i.e., a tail rotor, or be adapted to provide sufficient anti-torque to completely eliminate the need for the additional anti-torque device. Another significant advantage is the low-profiled contoured surfaces of tail boom 301, which decrease the slipstream separation as rotorwash travels around boom 301. The reduced slipstream separation results in less power consumption and increased payload lift.

Referring now to FIG. 4 in the drawings, a left side view of tail boom 301 is shown. FIG. 4 shows the longitudinal lengths of side surface 309 and side surface 311 gradually tapering down from end 307 to a distal end 317. In the preferred embodiment, the longitudinal lengths of side surface 309 and side surface 311 extend linearly from end 307 to end 317; however, it should be appreciated that alternative embodiments could include non-linear longitudinal profiles. For example, an alternative embodiment could include side surfaces having concave or convex longitudinal profiles.

In the preferred embodiment, tail boom 301 is further provided with an anti-torque system 319. In this embodiment, anti-torque system 319 is a conventional tail rotor adapted to create a force opposing the fuselage torque. It should be appreciated that alternative embodiments could include different types of anti-torque devices in lieu of a tail rotor. For example, an alternative embodiment could include a strake, fin, circulation system, or other suitable anti-torque system operably associated with tail boom 301. In addition, it should be appreciated that alternative embodiments could include a tail boom 301 devoid of an anti-torque system (see FIG. 11).

Tail boom 301 is further provided with an optional flow control device 401 adapted to control the flow of rotorwash flowing over side surface 309. It should be understood that although control device 401 is shown attached to side surface 309, control device 401 can be attached to any surface of tail rotor 301. In the preferred embodiment, control device 401 passively controls flow direction and/or flow separation over side surface 309, with a plurality of fins; however, it should be appreciated that alternative embodiments could include a control device that actively controls flow direction and/or flow separation over surface 309. Alternative embodiments could also include dimples, grooves, or other surface treatments on the contoured surfaces of tail boom 301 for passively controlling the flow direction and/or flow separation over the side surface 309 and side surface 311.

FIG. 4 also illustrates the gradual tapering of the chord length from end 307 to distal end 317. In the preferred embodiment, the chord length linearly decreases; however, it should be appreciated that alternative embodiments could include tail booms having chords lengths tapering in a non-linear fashion or include tail booms having a chord length remaining relatively fixed. For example, the tail boom chord length could taper upwardly, downwardly, remain constant, or include concave or convex geometric profiles.

Figure 5:
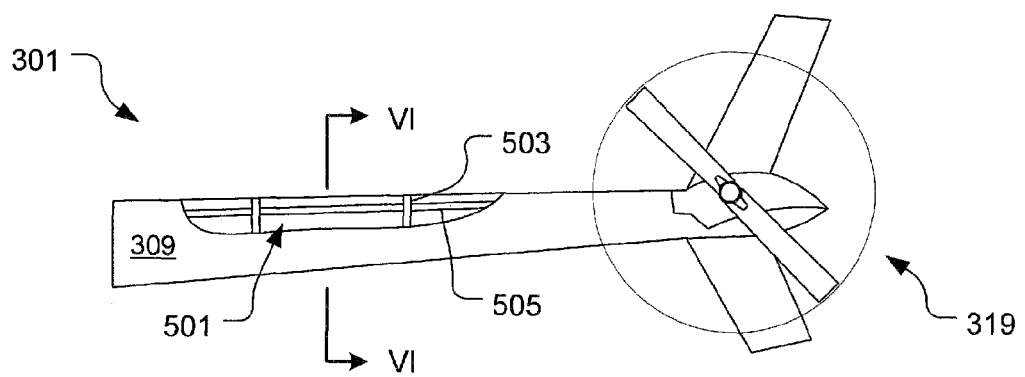
FIG. 5 is partially cutout view of the tail boom of FIG. 4.

Referring now to FIG. 5 in the drawings, a partial cutout view of tail boom 301 is shown. FIG. 5 provides illustration of the components disposed within tail boom 301. In the preferred embodiment, tail boom 301 has an inner cavity 501. However, it should be appreciated that alternative embodiments could easily be manufactured as a solid member having no inner cavity. Tail boom 301 is further provided with one or more ribs 503 disposed within inner cavity 501 for providing additional rigidity and support. Ribs 503 are also adapted to support a tail rotor drive shaft 505 extending within inner cavity 501.

Referring now to FIG. 6 in the drawings, a cross-sectional view of tail boom 301 is shown taken at VI-VI of FIG. 5. FIG. 6 provides further illustration of the contoured surfaces of tail boom 301. In the preferred embodiment, side surface 309 acts as a pressure surface of an airfoil, while side surface 311 acts as a suction surface of an airfoil. However, it should be appreciated that tail boom 301 can easily be modified such that side surface 311 is contoured to act as the pressure surface of an airfoil, and which side surface 309 is contoured to act as the suction surface of an airfoil.

FIG. 6 also illustrates chord length 601 of tail boom 301 oriented at an angle B with respect to the rotorwash. In the preferred embodiment, tail boom 301 is rigidly attached to fuselage 303 and is oriented at an approximate six-degree angle of attack with respect to the rotorwash. However, it should be appreciated that alternative embodiments could include tail booms having different angles of attack for optimal performance. In addition, alternative embodiments could include rotatable tail booms adapted for providing pivot movement of the tail boom, which allows the tail boom to change the angle of attack to any operational angle within the rotorwash.

Referring now to FIG. 7 in the drawings, an alternative embodiment of tail boom 301 is shown. Tail boom 701 is substantially similar in form and function to tail boom 301. Tail boom 701 is further provided with a flap 703 pivotally attached to the trailing edge via an attachment device 705. As is shown, flap 703 pivots at an arc C with respect to tail boom 701. The pivoting movement is created either manually by pilot control or autonomously via a control system (not shown). Flap 703 provides additional flow control of the rotorwash traveling around the contoured surfaces of tail boom 701, which in turn, increases or decreases the lateral force magnitude.

Figure 8:
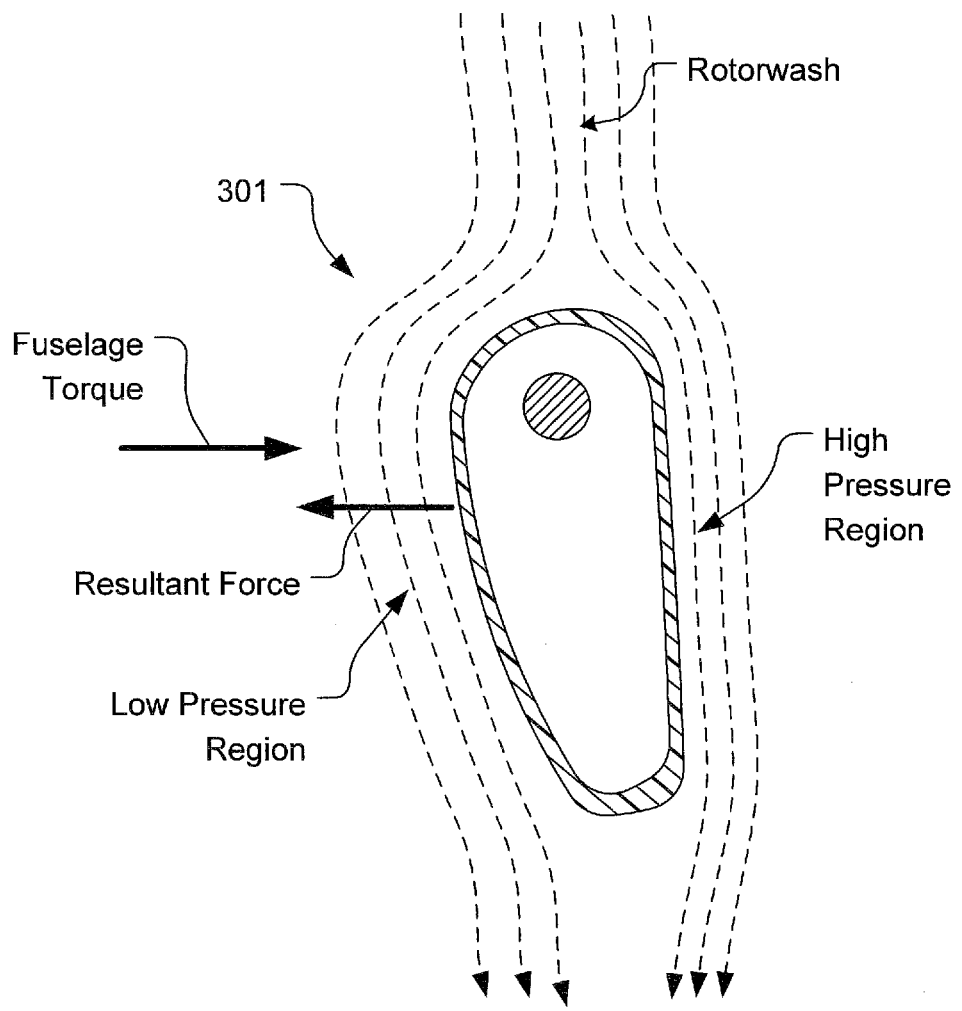
FIG. 8 is a schematic view of rotorwash flowing around the tail boom of FIG. 6.

FIG. 8 illustrates a schematic representation of rotorwash flow patterns traveling around tail boom 301. During operation, rotorwash must travel a greater distance around side surface 311 than side surface 309, resulting in a low-pressure region forming around side surface 311 and a high-pressure region forming around side surface 309. The pressure difference in the regions causes tail boom 301 to move towards the low-pressure region, resulting in tail boom 301 moving in a direction opposing the fuselage torque.

Figure 11:
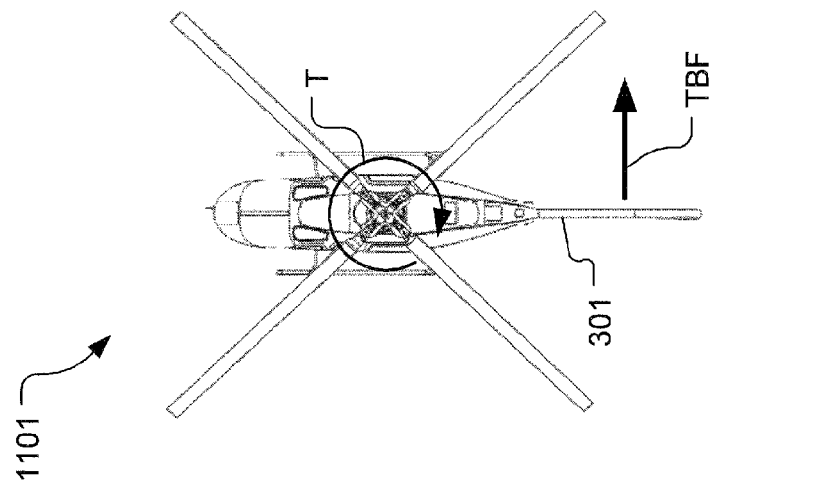
FIG. 11 is an alternative embodiment of the helicopter of FIG. 9.
Figure 10:
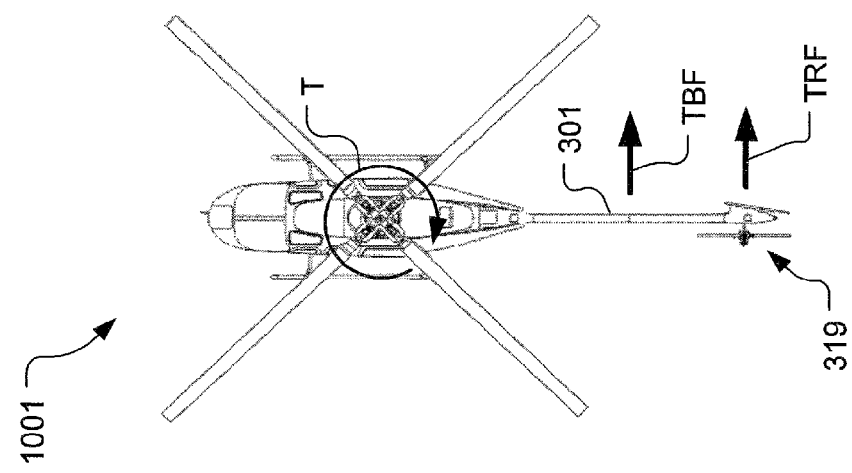
FIG. 10 is a top view of a helicopter according the preferred embodiment of the present application.
Figure 9:
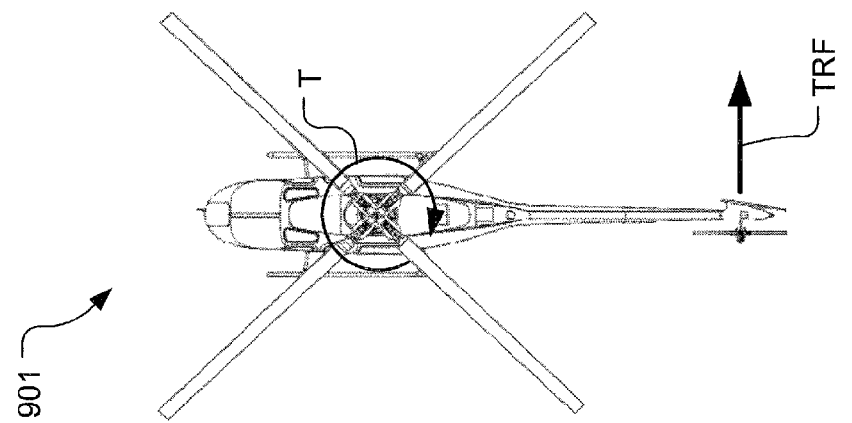
FIG. 9 is a top view of a conventional helicopter.

FIGS. 9-11 illustrate tail boom 301 operably associated with a helicopter. FIG. 9 shows a top view of a conventional helicopter 901, which includes a tail rotor for counteracting the fuselage torque T. During operation, the tail rotor creates a tail rotor force TRF in a direction opposite to the fuselage torque T. As discussed above, tail rotors are effective anti-torque devices during takeoff, landing, and low forward speeds. The tail rotor and associated drive system must be sized for the low speed regime. As a result, the tail rotor is generally larger and heavier than needed in other flight regimes and produces additional drag and power penalties at high speeds. These factors are cumulative and all result in degradation of helicopter performance.

Tail boom 301 greatly reduces the requirement for larger tail rotors, thereby decreasing the additional drag and power penalties in hover and at high speed. FIG. 10 shows a top view of a helicopter 1001 according the preferred embodiment of the present application. Helicopter 1001 comprises a tail boom 301 and an anti-torque system 319, i.e, a tail rotor. As is shown, the tail boom creates a force TBF in the same direction as the tail rotor force TRF. The additional force created by tail boom 301 reduces the force required by anti-torque system 319 to counteract fuselage torque T. It should be understood that this embodiment includes a tail boom that does not completely replace the anti-torque system; however, it should be appreciated that tail boom 301 provides sufficient torque such that anti-torque system 319 is required to produce less torque to counteract fuselage torque T, resulting in a smaller and lighter anti-torque system. Thus, helicopter 1001 is lighter, consumes less power, and can carry a higher payload than conventional helicopter 901.

FIG. 11 shows an alternative embodiment of helicopter 1001. Helicopter 1101 is substantially similar in form and function to helicopter 1001. However, helicopter 1101 does not include an anti-rotational system 319, such as a tail rotor, and relies solely on tail boom 301 to provide the necessary torque to counteract fuselage torque T. In this embodiment, tail boom 301 preferably includes an attachment device 305 and associated control systems for rotating tail boom 301 such that the desired force TBF is created to counteract the varying fuselage torque T.

Referring now to FIG. 12 in the drawings, an oblique view of an alternative embodiment of a tail boom is illustrated. Tail boom 1201 is substantially similar in form and function to the tail booms discussed above and could easily be adapted to include the features discussed herein, and vice-versa. Specifically, tail boom 1201 utilizes the rotorwash from the main rotor to create lateral force in a direction opposing the fuselage torque. In the illustrative embodiment, tail boom 1201 is a passive anti-torque device; however, it is also contemplated utilizing other anti-torque device, for example, a tail rotor, to counteract the fuselage torque. Further discussion of these features is provided below and illustrated in the accompanying drawings.

Tail boom 1201 has an elongated body 1203 that extends from a first end 1205 to a second end 1207, wherein the first end 1205 attaches to the fuselage and the second end 1207 attaches to the tail rotor. The sides of body 1203 are contoured to form an airfoil, specifically, a pressure surface and a suction surface. In the illustrative embodiment, the chord length of body 1203 gradually decreases from end 1205 to 1207, which further enhances the aerodynamic efficiency. However, it will be appreciated that alternative embodiments could include a body having a constant chord length in lieu of the preferred embodiment.

FIG. 13 illustrates a cross-sectional view of tail boom 1201 taken at XIII-XIII of FIG. 12. As discussed, tail boom 1201 acts as an airfoil in the rotorwash to create a lateral force opposing the fuselage torque. To achieve this feature, tail boom 1201 is contoured to include a first surface 1301 that creates a low-pressure region and a second surface 1303 that creates a high-pressure region. Thus, surface 1301 is commonly referred to as a suction surface of an airfoil, while surface 1303 is referred to as a pressure surface of the airfoil. When immersed under the helicopter's main rotor downwash in hover, tail boom 1201 has the propensity to move towards the low-pressure area, which opposes the fuselage torque directional movement.

Both surfaces 1301 and 1303 extend from a leading edge 1305 to a trailing edge 1307. One of the unique features believed characteristic of tail boom 1201 is the use of a rounded corner 1309 that joins surface 1301 to trailing edge 1307 and a sharp edge 1311 that joins surface 1303 to trailing edge 1307. The use of both the rounded corner 1309 and the sharp edge 1311 greatly enhances the overall performance of tail boom 1201 during sideward flight of the helicopter. For example, the rounded corner reduces drag during right sideward flight and increases the pedal margin. The sharp edge fixes the flow separation point during right sideward flight around a surface 1313 of edge 1311, resulting in improved handling qualities and reduced pilot workload.

In the contemplated embodiment, edge 1311 includes two relatively linear surfaces 1313 and 1315 forming angle A between each surface. In the preferred embodiment, angle A is approximately 90 degrees; however, it will be appreciated that other angles are also contemplated in alternative embodiments.

It is evident by the foregoing description that the contoured tail boom has significant benefits and advantages over conventional anti-torque devices. For example, rotorwash flowing around the contoured surfaces of the tail boom produces low- and high-pressure regions, which in turn, causes the tail boom to move in the lateral direction opposing the fuselage torque. The tail boom can be adapted for use with an existing anti-torque device, i.e., a tail rotor, or can be utilized as the sole means for counteracting the fuselage torque. In either embodiment, the contoured tail boom greatly reduces anti-torque requirement during flight and reduces overall weight of the helicopter, resulting in a more efficient helicopter requiring less power consumption and resulting in a helicopter capable of carrying a heavier payload. Furthermore, the tail boom can be adapted with a flap for controlling the lateral force magnitude.

The particular embodiments disclosed above are illustrative only, as the tail boom may be modified and practiced in different but equivalent manners apparent to those skilled in the art having the benefit of the teachings herein. It is therefore evident that the particular embodiments disclosed above may be altered or modified, and all such variations are considered within the scope and spirit of the tail boom. Accordingly, the protection sought herein is as set forth in the description. It is apparent that a tail boom with significant advantages has been described and illustrated. Although the present tail boom is shown in a limited number of forms, it is not limited to just these forms, but is amenable to various changes and modifications without departing from the spirit thereof.

What is claimed is:

1. A rotary aircraft, comprising:
   a fuselage;
   an engine carried by the fuselage;
   a main rotor rotatably attached to the engine; and
   a tail boom attached to and extending from the fuselage, the tail boom having:
      a body having a first side surface and an opposing second side surface, the first side surface being contoured to act as a pressure surface of an airfoil and the second side surface being contoured to act as a suction surface of an airfoil;
      a leading edge; and
      a trailing edge, having:
         a rounded corner; and
         a sharp edge;
      wherein both the first surface and the second surface extend from the leading edge to the trailing edge;
      wherein the rounded corner joins the second surface to the trailing edge;
      wherein the sharp edge joins the first surface to the trailing edge; and
      wherein the sharp edge reduces drag of the tail boom during a sideward flight motion of the aircraft;
   wherein the engine rotates the main rotor, thereby creating rotorwash and a fuselage torque;
   wherein the rotorwash flows around the first side surface and the second side surface of the tail boom, resulting in a high-pressure region forming near the first side surface and resulting in a low-pressure region forming near the second side surface;
   wherein the pressure difference between the high-pressure region and the low-pressure region causes the tail boom to move towards the low-pressure region, resulting in a lateral force opposing the fuselage torque; and
   wherein the tail boom is rotatably attached to the fuselage.

2. The rotary aircraft according to claim 1, wherein an angle of attack of the tail boom with respect to the rotorwash is approximately six degrees.

3. The rotary aircraft according to claim 1, the sharp edge comprising:
   a first linear surface; and
   a second linear surface;
   wherein the first linear surface is oriented at an angle relative to the second linear surface.

4. The rotary aircraft according to claim 3, wherein the angle is about 90 degrees.

5. The rotary aircraft according to claim 1, further comprising:
   an anti-torque system attached to the tail boom.

6. The rotary aircraft according to claim 5, wherein the anti-torque system is a tail rotor.

7. A method to control fuselage torque of a rotary aircraft, comprising:
   providing a tail boom attached to a fuselage of the rotary aircraft in accordance with the features of claim 1;
   creating a high-pressure region in a downward rotorwash along a first surface of the tail boom; and
   creating a low-pressure region in the downward rotorwash along a second surface of the tail boom;
   wherein the differences in low-pressure and high-pressure regions causes the tail boom to move in a lateral direction opposing the fuselage torque.

8. The method of claim 7, further comprising:
   supplementing the lateral directional movement of the tail boom with an anti-torque system.

9. A rotary aircraft, comprising:
   a fuselage;
   a main rotor;
   a tail boom attached to and extending from the fuselage, the tail boom having:
      a first surface and a second surface;
      a leading edge;
      a trailing edge, having:
         a rounded corner; and
         a sharp edge; and
      a pressure surface and a suction surface, both extending from the leading edge to the trailing edge;
      wherein both the first surface and the second surface extend from the leading edge to the trailing edge;
      wherein the rounded corner joins the second surface to the trailing edge;
      wherein the sharp edge joins the first surface to the trailing edge;
      wherein the sharp edge reduces drag of the tail boom during a sideward flight motion of the aircraft; and
   a tail rotor attached to the tail boom;
   wherein the tail boom creates a high-pressure region and a low-pressure region in the rotorwash flowing therearound, which in turn creates a lateral force in a direction opposing a fuselage torque during flight; and
   wherein the tail boom is rotatably attached to the fuselage.

10. The rotary aircraft of claim 9, further comprising:
    a flow control device attached to the tail boom.

11. The rotary aircraft of claim 9, the sharp edge comprising:
    a first linear surface; and
    a second linear surface;
    wherein the first linear surface is oriented at an angle relative to the second linear surface.

12. The rotary aircraft of claim 11, wherein the angle is about 90 degrees.

* * * * *